US 12,452,888 B2

United States Patent
Zhao et al.

(10) Patent No.: US 12,452,888 B2
(45) Date of Patent: Oct. 21, 2025

(54) METHOD PERFORMED BY USER EQUIPMENT, AND USER EQUIPMENT

(71) Applicant: Sharp Kabushiki Kaisha, Sakai (JP)

(72) Inventors: Yinan Zhao, Shanghai (CN); Chao Luo, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 382 days.

(21) Appl. No.: 18/016,521

(22) PCT Filed: Jun. 9, 2021

(86) PCT No.: PCT/CN2021/099100
§ 371 (c)(1),
(2) Date: Jan. 17, 2023

(87) PCT Pub. No.: WO2022/017037
PCT Pub. Date: Jan. 27, 2022

(65) Prior Publication Data
US 2023/0276473 A1   Aug. 31, 2023

(30) Foreign Application Priority Data
Jul. 23, 2020  (CN) .......................... 202010720379.9

(51) Int. Cl.
*H04W 72/40*   (2023.01)
*H04W 72/0453*   (2023.01)

(52) U.S. Cl.
CPC ....... *H04W 72/40* (2023.01); *H04W 72/0453* (2013.01)

(58) Field of Classification Search
CPC ... H04W 72/0453; H04W 72/40; H04W 4/70; H04W 4/46; H04W 72/0446; H04W 72/02; H04L 1/1887; H04L 1/1893
See application file for complete search history.

(56) References Cited

U.S. PATENT DOCUMENTS 11,215,715 B2 * 1/2022 Chae ................ H04W 64/003
2018/0063816 A1   3/2018 Gulati et al.
(Continued)

FOREIGN PATENT DOCUMENTS

| CN | 109803321 A | 5/2019 |
|---|---|---|
| CN | 110235494 A | 9/2019 |

OTHER PUBLICATIONS

Official Communication issued in International Patent Application No. PCT/CN2021/099100, mailed on Aug. 20, 2021.
(Continued)

*Primary Examiner* — Brian D Nguyen
(74) *Attorney, Agent, or Firm* — Keating & Bennett, LLP

(57) ABSTRACT

Provided in the present invention are a method performed by user equipment and user equipment. The method includes: a MAC entity of user equipment receiving configuration information from upper layers, wherein the MAC entity is configured by the upper layers to perform sensing-based sidelink transmission; the user equipment selecting time domain and frequency domain resources for a first transmission opportunity; and the user equipment selecting time domain and frequency domain resources for a second transmission opportunity.

2 Claims, 3 Drawing Sheets

(56) References Cited

U.S. PATENT DOCUMENTS

| | | | |
|---|---|---|---|
| 2019/0082421 A1 | 3/2019 | Sartori et al. | |
| 2019/0182806 A1 | 6/2019 | Chae et al. | |
| 2019/0265364 A1* | 8/2019 | Chae | H04W 64/003 |
| 2020/0229146 A1 | 7/2020 | Gulati et al. | |
| 2021/0007096 A1* | 1/2021 | Huang | H04L 1/1887 |
| 2021/0153176 A1* | 5/2021 | Lee | H04W 4/40 |
| 2021/0204301 A1* | 7/2021 | Lee | H04W 72/566 |
| 2022/0007378 A1* | 1/2022 | Basu Mallick | H04L 5/001 |
| 2023/0361918 A1* | 11/2023 | Lee | H04W 72/23 |

OTHER PUBLICATIONS

CATT, "Discussion on shorter resource reservation period in PC5-based V2V", 3GPP TSG RAN WG1 Meeting #88, R1-1702035, Feb. 13-17, 2017, 8 pages.

Vodafone, "New SID: Study on NR V2X", 3GPP TSG RAN Meeting #80, RP-181429, Jun. 11-14, 2018, 5 pages.

Huawei et al., "New WID on 3GPP V2X Phase 2", 3GPP TSG RAN Meeting #75, RP-170798, Mar. 6-9, 2017, 5 pages.

LG Electronics et al., "New WI proposal: Support for V2V services based on LTE sidelink", 3GPP TSG RAN Meeting #70, RP-152293, Dec. 7-10, 2015, 8 pages.

Qualcomm Incorporated, "Work Item Proposal for Enhanced LTE Device to Device Proximity Services", 3GPP TSG RAN Meeting #66, RP-142311, Dec. 8-11, 2014, 8 pages.

Qualcomm Incorporated, "Work item proposal on LTE Device to Device Proximity Services", 3GPP TSG RAN Meeting #63, RP-140518, Mar. 3-6, 2014, 7 pages.

\* cited by examiner

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

In conventional cellular networks, all communication needs to be forwarded via base stations. By contrast, D2D communication (device-to-device communication) refers to a technique in which two user equipment units directly communicate with each other without needing a base station or a core network to perform forwarding therebetween. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:
1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:
1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and is used to implement information exchange between a vehicle and all entities that may affect the vehicle, for the purpose of reducing accidents, alleviating traffic congestion, reducing environmental pollution, and providing other information services. Application scenarios of V2X mainly include four aspects:
1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle to Network, i.e., a vehicle connects to a mobile network;
4) V2I: Vehicle to Infrastructure, i.e., a vehicle communicates with road infrastructure. 3GPP divides the research and standardization of V2X into three stages. The first stage was completed in September 2016, and mainly focused on V2V and was based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly used to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:
1) higher density DMRS to support high-speed scenarios;
2) introduction of subchannels to enhance resource allocation methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, V2X feasibility research project based on 5G NR network technologies (see Non-Patent Document 5), was approved at the 3GPP RAN #80 plenary meeting in June 2018.

In the LTE Release 14 V2X project, user equipment sensing-based resource allocation mode 4, or referred to as transmission mode 4, is supported. In resource allocation mode 4, the physical layer of the user equipment senses transmission resources in a resource pool, and reports a set of available transmission resources to higher layers. Upon acquiring the report from the physical layer, the higher layers select a specific resource for sidelink transmission.

The solution of the present patent mainly includes a method used by user equipment to select a resource for sidelink transmission in LTE V2X.

Meanwhile, in NR sidelink standardization study, in analogy to LTE V2X, a user equipment sensing-based resource allocation mode is also introduced, and is referred to as resource allocation mode 2. In resource allocation mode 2, the physical layer of the user equipment senses transmission resources in a resource pool, and reports a set of available transmission resources to higher layers. Upon acquiring the report from the physical layer, the higher layers select a specific resource for sidelink transmission.

The solution of the present patent also includes a method used by user equipment to select a resource for sidelink transmission in NR sidelink.

PRIOR ART DOCUMENT

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink
Non-Patent Document 4: RP-170798, New WID on 3GPP V2X Phase 2
Non-Patent Document 5: RP-181480, New SID Proposal: Study on NR V2X

SUMMARY

In order to address at least part of the aforementioned issues, the present invention provides a method performed by user equipment, and user equipment.

According to an aspect of the present invention, provided is a method performed by user equipment, comprising the following steps:

user equipment determining a first set of subframes $t_{n+f \times P'_{rsvp\_TX}}^{SL}$, j=0,1, . . . , as a time domain resource set for a first transmission opportunity; and the user equipment determining a second set of subframes $t_{n+f \times P'_{rsvp\_TX}}^{SL}$, j=0,1, . . . , as a time domain resource set for a second transmission opportunity;

wherein $P'_{rsvp\_TX} = P_{step} \times P_{rsvp\_TX}/100$, $P_{rsvp\_TX}$ represents a resource reservation period indicated by higher layers, $P_{step}$ is determined on the basis of time division duplexing (TDD) configuration information, and the second set of subframes meets the following conditions: $-15 \leq k \leq 15$, $k \neq 0$, and $k \mod P'_{rsvp\_TX} \neq 0$.

In the above method performed by user equipment, optionally, the user equipment is LTE sidelink user equipment.

In the above method performed by user equipment, optionally, the user equipment transmits a physical sidelink shared channel (PSSCH) in one or more subframes included in the first set of subframes and the second set of subframes.

According to another aspect of the present invention, provided is user equipment, comprising:

a processor; and a memory storing instructions, wherein the instructions, when run by the processor, cause the user equipment to perform the method described above.

Beneficial Effects of Present Invention

According to the solution of the present patent, in LTE V2X sidelink, it can be effectively ensured that user equipment does not select more than one sidelink resource on the same subframe, and the single-carrier feature (SC-FDMA) in LTE transmission is ensured, thereby reducing transmission interference and improving transmission reliability.

Likewise, according to the solution of the present patent, it can be effectively ensured that in NR sidelink, user equipment does not select more than one sidelink resource on the same slot, and it is ensured that different sidelink transmissions of NR sidelink user equipment do not overlap in the time domain.

BRIEF DESCRIPTION OF THE DRAWINGS

The above and other features of the present invention will be more apparent from the following detailed description in combination with the accompanying drawings.

DETAILED DESCRIPTION

Figure 1:
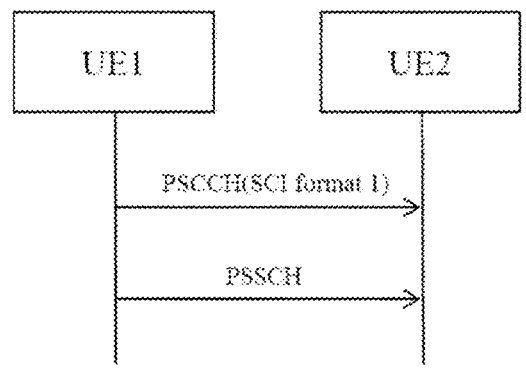
FIG. 1 is a schematic diagram showing sidelink communication of LTE V2X UE.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following embodiments, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station
gNB: NR base station
TTI: Transmission Time Interval
OFDM: Orthogonal Frequency Division Multiplexing
CP-OFDM: Cyclic Prefix Orthogonal Frequency Division Multiplexing
C-RNTI: Cell Radio Network Temporary Identifier
CSI: Channel State Information
HARQ: Hybrid Automatic Repeat Request
CSI-RS: Channel State Information Reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
RB: Resource Block
RE: Resource Element
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB1: System Information Block Type 1
SLSS: Sidelink Synchronization Signal
PSSS: Primary Sidelink Synchronization Signal SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel
SPS: Semi-Persistent Scheduling
TA: Timing Advance
PT-RS: Phase-Tracking Reference Signal
TB: Transport Block
CB: Code Block
QPSK: Quadrature Phase Shift Keying
16/64/256 QAM: 16/64/256 Quadrature Amplitude Modulation
AGC: Automatic Gain Control
TDRA (field): Time Domain Resource Assignment indication (field)
FDRA (field): Frequency Domain Resource Assignment indication (field)
ARFCN: Absolute Radio Frequency Channel Number
SC-FDMA: Single Carrier-Frequency Division Multiple Access The following is a description of the prior art associated with the solution of the present invention. Unless otherwise specified, the same terms in the specific embodiments have the same meanings as in the prior art.

It is worth pointing out that the V2X and sidelink mentioned in the description of the present invention have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present invention can equivalently replace each other. The resource allocation mode involved in the description can mean a transmission mode, and the transmission mode involved herein can mean a resource allocation mode. In NR sidelink, transmission mode 1 represents a base station scheduling-based transmission mode (resource allocation mode), and transmission mode 2 represents a user equipment sensing-based and resource selection-based transmission mode (resource allocation mode).

The PSCCH in the description of the present invention is used to carry SCI. The PSSCH associated with or relevant to or corresponding to or scheduled by PSCCH involved in the description of the present invention has the same meaning, and all refer to an associated PSSCH or a corresponding PSSCH. Similarly, the SCI (including first stage SCI and second stage SCI) associated with or relevant to or corresponding to PSSCH involved in the description has the same meaning, and all refer to associated SCI or corresponding SCI. It is worth pointing out that the first stage SCI, referred to as 1st stage SCI or SCI format 0-1, is transmitted in the PSCCH; and the second stage SCI, referred to as 2nd stage SCI or SCI format 0-2, is transmitted in resources of the corresponding PSSCH.

Sidelink Communication Scenario

1) Out-of-coverage sidelink communication: Both of two UEs performing sidelink communication are out of network coverage (for example, the UE cannot detect any cell that meets a "cell selection criterion" on a frequency at which sidelink communication needs to be performed, and that means the UE is out of network coverage).

2) In-coverage sidelink communication: Both of two UEs performing sidelink communication are in network coverage (for example, the UE detects at least one cell that meets a "cell selection criterion" on a frequency at which sidelink communication needs to be performed, and that means the UE is in network coverage).

3) Partial-coverage sidelink communication: One of two UEs performing sidelink communication is out of network coverage, and the other is in network coverage.

From the perspective of a UE side, the UE has only two scenarios, out-of-coverage and in-coverage. Partial-coverage is described from the perspective of sidelink communication.

Basic Procedure of LTE V2X (Sidelink) Communication

FIG. 1 is a schematic diagram showing sidelink communication of LTE V2X UE. First, UE1 transmits to UE2 sidelink control information (SCI format 1), which is carried by a physical layer channel PSCCH. SCI format 1 includes scheduling information of a PSSCH, such as frequency domain resources and the like of the PSSCH. Secondly, UE1 transmits to UE2 sidelink data, which is carried by the physical layer channel PSSCH. The PSCCH and the corresponding PSSCH are frequency division multiplexed, that is, the PSCCH and the corresponding PSSCH are located in the same subframe in the time domain but are located on different RBs in the frequency domain. In LTE V2X, one transport block (TB) may include only one initial transmission, or include one initial transmission and one blind retransmission (indicating a retransmission not based on HARQ feedback).

Specific design methods of the PSCCH and the PSSCH are as follows:

1) The PSCCH occupies one subframe in the time domain and two consecutive RBs in the frequency domain. Initialization of a scrambling sequence uses a predefined value of 510. The PSCCH may carry SCI format 1, where SCI format 1 at least includes frequency domain resource information of the PSSCH. For example, for a frequency domain resource indication field, SCI format 1 indicates a starting sub-channel number and the number of consecutive sub-channels of the PSSCH corresponding to the PSCCH.

2) The PSSCH occupies one subframe in the time domain, and the PSSCH and the corresponding PSCCH are frequency division multiplexed. The PSSCH occupies one or a plurality of consecutive sub-channels in the frequency domain. The sub-channels represent $n_{subCHsize}$ consecutive RBs in the frequency domain. $n_{subCHsize}$ is configured by an RRC parameter, and a starting sub-channel and the number of consecutive sub-channels are indicated by the frequency domain resource indication field of SCI format 1.

LTE V2X Resource Allocation Modes: Transmission Mode 3/Transmission Mode 4

Figure 2:
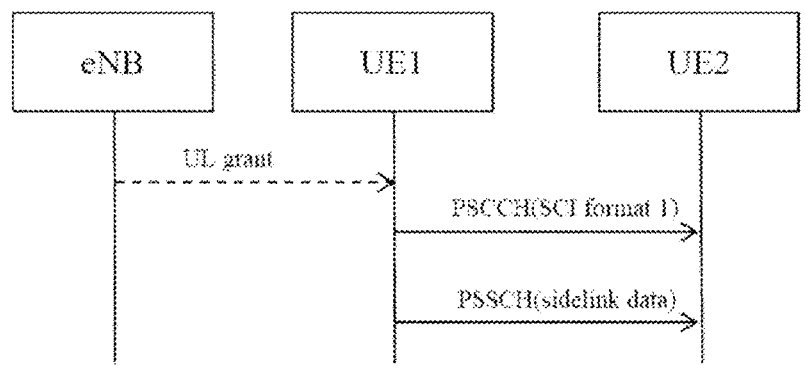
FIG. 2 is a schematic diagram showing a resource allocation mode of LTE V2X.

FIG. 2 shows two LTE V2X resource allocation modes, which are referred to as base station scheduling-based resource allocation (transmission mode 3) and UE sensing-based resource allocation (transmission mode 4), respectively. In NR sidelink, transmission mode 3 in LTE V2X corresponds to transmission mode 1 in NR V2X, and is a base station scheduling-based transmission mode, and transmission mode 4 in LTE V2X corresponds to transmission mode 2 in NR V2X, and is a UE sensing-based transmission mode. In LTE V2X, in eNB network coverage, a base station can configure, through UE-level dedicated RRC signaling SL-V2X-ConfigDedicated, a resource allocation mode of UE, or referred to as a transmission mode of the UE, which is specifically as follows:

1) Base station scheduling-based resource allocation mode (transmission mode 3): the base station scheduling-based resource allocation mode means that frequency domain resources used in sidelink communication are scheduled by the base station. Transmission mode 3 includes two scheduling modes, which are dynamic scheduling and semi-persistent scheduling (SPS), respectively. For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For semi-persistent scheduling (SPS), the base station configures one or a plurality of (at most 8) configured grants through IE: SPS-ConfigSL-r14, and each configured grant contains a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SL-V2X-ConfigDedicated is set to scheduled-r14, it indicates that the UE is configured in the base station scheduling-based transmission mode. The base station configures the SL-V-RNTI or the SL-SPS-V-RNTI via RRC signaling, and transmits the UL grant to the UE through the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH.

For SPS in transmission mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource allocation mode (transmission mode 4): The UE sensing-based resource allocation mode means that resources used in sidelink communication are based on a procedure of sensing, by the UE, a candidate available resource set. When the RRC signaling SL-V2X-ConfigDedicated is set to ue-Selected-r14, it indicates that the UE is configured in the UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

Sidelink Resource Pool

In sidelink communication, resources transmitted and received by UEs all belong to resource pools. For example, for a base station scheduling-based transmission mode in sidelink communication, the base station schedules transmission resources for sidelink UE in the resource pool; alternatively, for a UE sensing-based transmission mode in sidelink communication, the UE determines a transmission resource in the resource pool.

Numerologies in NR (Including NR Sidelink) and Slots in NR (Including NR Sidelink)

A numerology comprises two aspects: a subcarrier spacing and a cyclic prefix (CP) length. NR supports five subcarrier spacings, which are respectively 15 kHz, 30 kHz, 60 kHz, 120 kHz and 240 kHz (corresponding to $\mu=0, 1, 2, 3, 4$). Table 4.2-1 shows the supported transmission numerologies specifically as follows:

TABLE 4.2-1

Subcarrier Spacings Supported by NR

| $\mu$ | $\Delta f = 2^\mu \cdot 15$ [kHz] | CP (cyclic prefix) |
|---|---|---|
| 0 | 15 | Normal |
| 1 | 30 | Normal |
| 2 | 60 | Normal, extended |
| 3 | 120 | Normal |
| 4 | 240 | Normal |

Only when $\mu=2$, that is, in the case of a 60 kHz subcarrier spacing, an extended CP is supported, whereas only a normal CP is supported in the case of other subcarrier spacings. For a normal CP, each slot includes 14 OFDM symbols; for an extended CP, each slot includes 12 OFDM symbols. For $\mu=0$, that is, a 15 kHz subcarrier spacing, one slot=1 ms; for $\mu=1$, namely, a 30 kHz subcarrier spacing, one slot=0.5 ms; for $\mu=2$, namely, a 60 kHz subcarrier spacing, one slot=0.25 ms, and so on.

NR and LTE have the same definition for a subframe, which denotes 1 ms. For a subcarrier spacing configuration $\mu$, a slot number in one subframe (1 ms) may be expressed as $n_s^\mu$, and ranges from 0 to $N_{slot}^{subframe,\mu}-1$. A slot number in one system frame (having a duration of 10 ms) may be expressed as $n_{s,f}^\mu$, and ranges from 0 to $N_{slot}^{frame,\mu}-1$. Definitions of $N_{slot}^{subframe,\mu}$ and $N_{slot}^{frame,\mu}$ for different subcarrier spacings $\mu$ are shown in the tables below:

TABLE 4.3.2-1 the number of symbols included in each slot, the number of slots included in each system frame, and the number of slots included in each subframe for the normal CP

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4.3.2-2 the number of symbols included in each slot, the number of slots included in each system frame, and the number of slots included in each subframe for the extended CP (60 kHz)

| μ | $N_{symb}^{slot}$ | $N_{slot}^{frame,\mu}$ | $N_{slot}^{subframe,\mu}$ |
|---|---|---|---|
| 2 | 12 | 40 | 4 |

On an NR carrier, a system frame (or simply referred to as frame) number (SFN) ranges from 0 to 1023. The concept of a direct system frame number DFN is introduced to sidelink communication, and the number likewise ranges from 0 to 1023. The above description of the relationship between the system frame and the numerology can also be applied to a direct system frame. For example, the duration of one direct system frame is likewise equal to 10 ms; for a 15 kHz subcarrier spacing, one direct system frame includes 10 slots, and so on. The DFN is applied to timing on a sidelink carrier.

Parameter Sets in LTE (Including LTE V2X) and Slots and Subframes in LTE (Including LTE V2X)

The LTE only supports a 15 kHz subcarrier spacing. Both the extended CP and the normal CP are supported in the LTE. The subframe has a duration of 1 ms and includes two slots. Each slot has a duration of 0.5 ms.

For a normal CP, each subframe includes 14 OFDM symbols, and each slot in the subframe includes 7 OFDM symbols; for an extended CP, each subframe includes 12 OFDM symbols, and each slot in the subframe includes 6 OFDM symbols.

Resource Block (RB) and Resource Element (RE)

The resource block (RB) is defined in the frequency domain as $N_{sc}^{RB}=12$ consecutive subcarriers. For example, for a 15 kHz subcarrier spacing, the RB is 180 kHz in the frequency domain. For a 15 kHz×$2^{\mu}$ subcarrier spacing, the resource element (RE) represents one subcarrier in the frequency domain and one OFDM symbol in the time domain.

Method for LTE V2X UE to Determine PSSCH Subframe Resource Pool

In LTE V2X, a method for determining a subframe resource pool is based on all subframes in a range of SFN #0 to SFN #1023, a total of 10240 subframes. Herein, a subframe set that may belong to a PSSCH subframe resource pool transmitted by V2X UE is represented as $(t_0^{SL}, t_1^{SL}, \ldots, t_{Tmax}^{SL}$, which meets the following conditions:

1) $0 \leq t_i^{SL} < 10240$;
2) subframes in the above subframe set are numbered relative to subframe #0 of SFN #0 or DFN #0, namely, a subframe with $t_i^{SL}=0$ corresponds to subframe #0 of SFN #0 or DFN #0;
3) the above subframe set includes all subframes after the following subframes (subframes included in a, b, and c) are excluded:
   a) subframes configured with an SLSS, the number of which is represented as $N_{SLSS}$;
   b) downlink subframes and special subframes in a TDD cell, the number of which is represented as $N_{dssf}$;
   c) reserved subframes, where a method for determining the reserved subframes is as follows:
      after $N_{SLSS}$ and $N_{dssf}$ subframes are excluded from all subframes with subframe numbers 0 to 10239, the remaining (10240−$N_{SLSS}$−$N_{dssf}$) subframes are arranged in ascending order of subframe numbers, which can be represented herein as $(l_0, l_1, \ldots, l_{10240-N_{SLSS}-N_{dssf}-1})$. $r=floor(^{m \cdot (10240-N_{SLSS}-N_{dssf})/}$ $N_{reserved})$, where m=0, 1, . . . , $N_{reserved}$−1, and $N_{reserved}$=(10240−$N_{SLSS}$−$N_{dssf}$) mod $L_{bitmap}$. $L_{bitmap}$ represents the length of a bitmap configured for the resource pool, and is configured by a higher layer, the bitmap can be represented as $(b_0, b_1, \ldots, b_{L_{bitmap}-1})$, and a subframe numbered corresponding to the subframe $l_r$ is a reserved subframe; and 4) the subframes in the subframe set are arranged in ascending order of subframe numbers.

A method used by the UE to determine the PSSCH subframe resource pool is as follows: for subframe $t_k^{SL}$ in the subframe set $(t_0^{SL}, t_1^{SL}, \ldots, t_{Tmax}^{SL})$, if $b_{k'}=1$, where k'=k mod $L_{bitmap}$, then subframe $t_k^{SL}$ belongs to the PSSCH subframe resource pool.

Reserved Resource for LTE V2X Transmission Mode 4

In LTE V2X transmission mode 4, when UE determines resources for sidelink transmission through a sensing procedure, the UE reserves resources for periodic traffic data. Assuming that a subframe determined by the UE for transmitting a PSSCH is represented as subframe $t_m^{SL}$, then the UE reserves the resource in subframes $t_{m+j \times P_{rsvp\_TX}}^{SL}$, where j=1, 2, . . . , $C_{resel}$−1, $C_{resel}$=10× SL_RESOURCE_RESELECTION_COUNTER, and SL_RESOURCE_RESELECTION_COUNTER is configured by a higher layer. If the higher layer does not configure the parameter, then $C_{resel}$=1. $P_{rsvp\_TX}=P_{step} \times P_{rsvp\_TX}/100$. LTE V2X includes a periodic traffic, and the period of traffic generation is approximately $P_{serv}$=100 ms, where $P_{step}$ represents the number of uplink subframes available in $P_{serv}$. The following Table 1 shows the values of $P_{step}$ in different TDD uplink and downlink configuration information in LTE V2X. For example, for TDD UL/DL configuration information 2, each system frame includes two uplink subframes. In a traffic period of $P_{serv}$=100 ms, there are a total of 20 uplink subframes. Table 1 shows the determination of $P_{step}$ for LTE V2X transmission mode 3 and transmission mode 4, as shown in the following table for details.

TABLE 1

Determination of $P_{step}$

| | $P_{step}$ |
|---|---|
| TDD with UL/DL configuration information 0 | 60 |
| TDD with UL/DL configuration information 1 | 40 |
| TDD with UL/DL configuration information 2 | 20 |
| TDD with UL/DL configuration information 3 | 30 |
| TDD with UL/DL configuration information 4 | 20 |
| TDD with UL/DL configuration information 5 | 10 |
| TDD with UL/DL configuration information 6 | 50 |
| Otherwise | 100 |

$P_{rsvp\_TX}$ represents a resource reservation interval indicated by higher layers.

Determination of Resource Reservation Indication Field in SCI Format 1 Performed by LTE V2X UE A resource reservation interval indicated by higher layers is represented as $P_{rsvp\_TX}$. UE determines the value of X=$P_{rsvp\_TX}$/100 according to the indication of the higher layers, and in conjunction with the following Table 2, the UE can determine a resource reservation indication field (4-bit indication field) in SCI.

TABLE 2

| Resource reservation indication field in SCI | X | Specific description |
|---|---|---|
| '0001', '0010', ..., '1010' | Value of indication field in SCI | 1 ≤ X ≤ 10. |
| '1011' | 0.5 | X = 0.5 |
| '1100' | 0.2 | X = 0.2 |
| '0000' | 0 | Higher layers indicate no reserved resources |
| '110', '1110', '1111' | Reserved value | |

UE Sensing Procedure in LTE V2X Transmission Mode 4

For a sensing procedure of UE, generally speaking, in LTE V2X transmission mode 4, a higher layer requests in subframe #n that sidelink data needs to be transmitted. In subframes $t_{n-10 \times P_{step}}^{SL}$, $t_{n-10 \times P_{step}+1}^{SL}$, ..., $t_{n-1}^{SL}$, the UE monitors SCI format 1 transmitted by another UE, and determines, according to the successfully decoded SCI format 1, an available resource in a candidate resource set between subframe #(n+T1) and subframe #(n+T2), and reports the determined available resource to the higher layer. If subframe #n belongs to the subframe set ($t_0^{SL}, t_1^{SL}, \ldots, t_{T_{max}}^{SL}$), then $t_{n'}^{SL}=n$; otherwise, $t_{n'}^{SL}$ indicates the first subframe of the subframe set ($t_0^{SL}, t_1^{SL}, \ldots, t_{T_{max}}^{SL}$) following subframe #n. T1 and T2 depend on a specific implementation of the UE.

Each element in the candidate resource set between subframe #(n+T1) and subframe #(n+T2), namely, each candidate resource, can be referred to as a candidate single subframe resource, which is represented by $R_{x,y}$. The specific definition of $R_{x,y}$ is as follows:
1) x represents consecutive $L_{subCH}$ sub-channels #(x+j) in the frequency domain, where j=0, 1, ..., $L_{subCH}-1$; and
2) y represents a time domain subframe $t_y^{SL}$.

The UE assumes that between subframe #(n+T1) and subframe #(n+T2), any consecutive $L_{subCH}$ sub-channels belonging to a PSSCH resource pool correspond to one candidate single subframe resource. The candidate resource set is represented by $S_A$.

A resource reservation indication field in the SCI format 1 received by the UE in subframe $t_m^{SL}$ is denoted as $P_{rsvp\_RX}$. If PSSCH resource blocks and subframe resources indicated in SCI format 1 received by the UE in subframe $t_m^{SL}$ or in the same SCI format 1 which is assumed by the UE to be received in subframe $t_{m+q \times P_{step} \times P_{rsvp\_RX}}^{SL}$ overlap or partially overlap with a candidate single subframe resource $R_{x,y+j \times P_{rsvp\_TX}}$ (comparison of RSRP also needs to be performed in a sensing procedure of UE, and details thereof will not be described in the present invention), then the UE excludes the candidate single subframe resource $R_{x, y}$ from $S_A$, where q=1, 2, ..., Q, and j=1, 2, ..., $C_{resel}-1$. If $P_{rsvp\_RX}<1$ and n'-m≤$P_{step} \times P_{rsvp\_RX}$, then Q=1/$P_{rsvp\_RX}$; otherwise, Q=1.

According to methods including, but not limited to, the above method, after the UE performs the sensing, the UE reports candidate single subframe resources that are not excluded to higher layers, so that the higher layers (e.g., the MAC layer) perform sidelink resource selection.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

Figure 3:
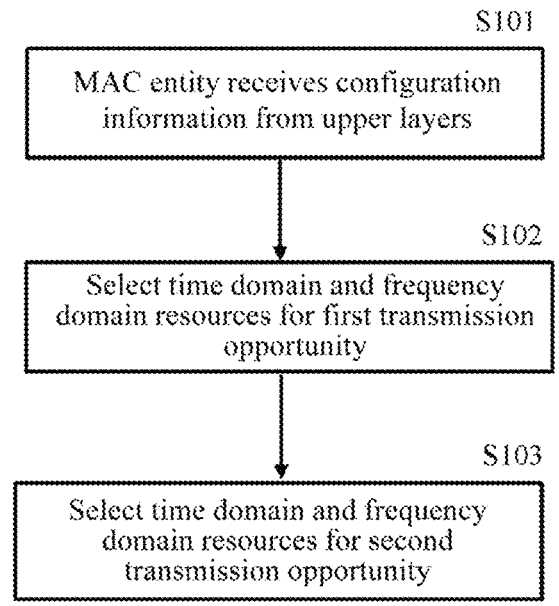
FIG. 3 is a schematic diagram showing a basic procedure of a method performed by user equipment according to Embodiments 1 and 3 of the invention.

FIG. 3 is a schematic diagram showing a basic procedure of a method performed by user equipment according to Embodiment 1 of the present invention.

The method performed by user equipment according to Embodiment 1 of the present invention is described in detail below in conjunction with the basic procedure diagram shown in FIG. 3.

As shown in FIG. 3, in Embodiment 1 of the present invention, the steps performed by the user equipment include the following:

In step S101, a MAC entity of sidelink user equipment receives configuration information from upper layers, wherein the MAC entity is configured by the upper layers to perform sensing-based sidelink transmission.

Optionally, the user equipment is LTE sidelink user equipment.

In step S102, the sidelink user equipment selects time domain and frequency domain resources for a first transmission opportunity.

Optionally, the user equipment randomly selects the time domain and frequency domain resources for the first transmission opportunity.

Or, optionally, the user equipment selects the time domain and frequency domain resources for the first transmission opportunity from sensed resources indicated (or reported) by the physical layer of the user equipment.

Or, optionally, the user equipment randomly selects the time domain and frequency domain resources for the first transmission opportunity from sensed resources indicated (or reported) by the physical layer of the user equipment.

In step S103, the sidelink user equipment selects time domain and frequency domain resources for a second transmission opportunity.

Optionally, the time domain and frequency domain resources for the second transmission opportunity correspond to time domain and frequency domain resources for HARQ retransmissions.

Optionally, the second opportunity includes one or more transmission opportunities.

Optionally, if the number of the HARQ retransmissions is equal to 1, and optionally, if among the sensed resources indicated (or reported) by the physical layer of the user equipment (optionally, after the user equipment has selected the time domain and frequency domain resources for the first transmission opportunity), available resources are left for more transmission opportunities, and optionally, the left available resources meet the following condition:

when the user equipment selects a set of subframes $t_{n+j \times P'_{rsvp\_TX}}^{SL}$ j=0,1, ..., optionally, as the time domain resources for the first transmission opportunity; and optionally, a set of time domain resource subframes $t_{n+k+j \times P'_{rsvp\_TX}}^{SL}$ j=0,1, ..., for the second transmission opportunity, where −15≤k≤15, and k≠0, and meanwhile, optionally, |k|≠$P'_{rsvp\_TX}$ (or, |k|≠n×$P'_{rsvp\_TX}$, where n represents a positive integer, or |k| is not a positive integer multiple of $P'_{rsvp\_TX}$ or mod(|k|, $P'_{rsvp\_TX}$)≠0 (or, mod(k, $P'_{rsvp\_TX}$)≠0), or |k|<$P'_{rsvp\_TX}$), the user equipment randomly selects the time domain and frequency domain resources for the second transmission opportunity.

Embodiment 2

Figure 4:
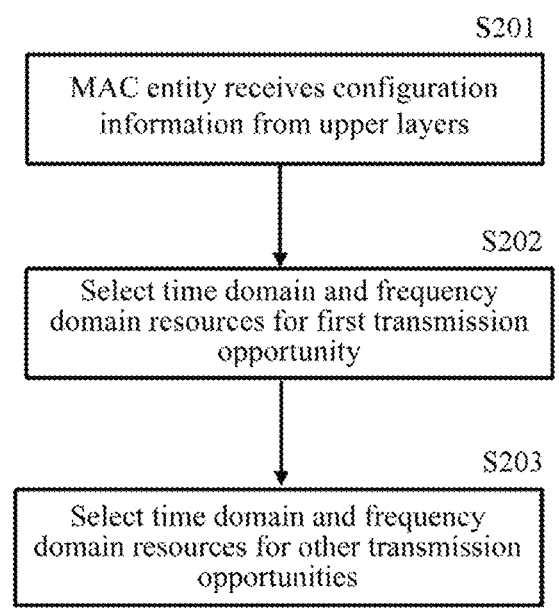
FIG. 4 is a schematic diagram showing a basic procedure of a method performed by user equipment according to Embodiment 2 of the invention.

FIG. 4 is a schematic diagram showing a basic procedure of a method performed by user equipment according to Embodiment 2 of the present invention.

The method performed by user equipment according to Embodiment 2 of the present invention is described in detail below in conjunction with the basic procedure diagram shown in FIG. 4.

As shown in FIG. 4, in Embodiment 2 of the present invention, the steps performed by the user equipment include the following:

In step S201, a MAC entity of sidelink user equipment receives configuration information from upper layers, wherein the MAC entity is configured by the upper layers to perform sensing-based sidelink transmission.

Optionally, the sensing-based sidelink transmission is NR sidelink resource allocation mode 2.

Optionally, the user equipment is NR sidelink user equipment.

In step S202, the sidelink user equipment selects time domain and frequency domain resources for a first transmission opportunity.

Optionally, the user equipment randomly selects the time domain and frequency domain resources for the first transmission opportunity.

Or, optionally, the user equipment selects the time domain and frequency domain resources for the first transmission opportunity from sensed resources indicated (or reported) by the physical layer of the user equipment.

Or, optionally, the user equipment randomly selects the time domain and frequency domain resources for the first transmission opportunity from sensed resources indicated (or reported) by the physical layer of the user equipment.

Optionally, the user equipment uses the time domain and frequency domain resources for the first transmission opportunity to select first periodic sidelink resources according to a resource reservation interval (indicating that time-frequency resources in each period correspond to the time domain and frequency domain resources for the first transmission opportunity).

Optionally, the user equipment considers that the first periodic sidelink resources are new transmission opportunities.

In step S203, the sidelink user equipment selects time domain and frequency domain resources for other transmission opportunities.

Optionally, the time domain and frequency domain resources for the other transmission opportunities correspond to time domain and frequency domain resources for HARQ retransmissions.

Optionally, the other transmission opportunities include one or more transmission opportunities.

Optionally, if the number of HARQ retransmissions is equal to 1 or greater than 1, and optionally, if among the sensed resources indicated (or reported) by the physical layer of the user equipment (optionally, after the user equipment has selected the time domain and frequency domain resources for the first transmission opportunity), available resources are left for more transmission opportunities, the user equipment randomly selects the time domain and frequency domain resources for the other transmission opportunities.

Optionally, the user equipment uses the time domain and frequency domain resources for the other transmission opportunities to select second periodic sidelink resources according to the resource reservation interval (indicating that time-frequency resources in each period correspond to the time domain and frequency domain resources for the other transmission opportunities).

Optionally, the user equipment considers that the second periodic sidelink resources are retransmission opportunities.

Optionally, the second periodic sidelink resources do not overlap, and/or the first periodic sidelink resources do not overlap, and/or the first periodic sidelink resources and the second periodic sidelink resources do not overlap.

Or, optionally, sidelink resources for (corresponding to) the retransmission opportunities do not overlap, and/or sidelink resources for (corresponding to) the new transmission opportunities do not overlap, and/or sidelink resources for (corresponding to) the retransmission opportunities and sidelink resources for (corresponding to) the new transmission opportunities do not overlap.

Embodiment 3

FIG. 3 is a schematic diagram showing a basic procedure of a method performed by user equipment according to Embodiment 3 of the present invention.

The method performed by user equipment according to Embodiment 3 of the present invention is described in detail below in conjunction with the basic procedure diagram shown in FIG. 3.

As shown in FIG. 3, in Embodiment 3 of the present invention, the steps performed by the user equipment include the following:

In step S101, a MAC entity of sidelink user equipment receives configuration information from upper layers, wherein the MAC entity is configured by the upper layers to perform sensing-based sidelink transmission.

Optionally, the user equipment is LTE sidelink user equipment.

In step S102, the sidelink user equipment selects time domain and frequency domain resources for a first transmission opportunity.

Optionally, the user equipment randomly selects the time domain and frequency domain resources for the first transmission opportunity.

Or, optionally, the user equipment selects the time domain and frequency domain resources for the first transmission opportunity from sensed resources indicated (or reported) by the physical layer of the user equipment.

Or, optionally, the user equipment randomly selects the time domain and frequency domain resources for the first transmission opportunity from sensed resources indicated (or reported) by the physical layer of the user equipment.

Optionally, the user equipment uses the time domain and frequency domain resources for the first transmission opportunity to select first periodic sidelink resources according to a resource reservation interval (indicating that time-frequency resources in each period correspond to the time domain and frequency domain resources for the first transmission opportunity).

Optionally, the user equipment considers that the first periodic sidelink resources are new transmission opportunities.

In step S103, the sidelink user equipment selects time domain and frequency domain resources for a second transmission opportunity.

Optionally, the time domain and frequency domain resources for the second transmission opportunity correspond to time domain and frequency domain resources for HARQ retransmissions.

Optionally, if the number of HARQ retransmissions is equal to 1, and optionally, if among the sensed resources indicated (or reported) by the physical layer of the user equipment (optionally, after the user equipment has selected the time domain and frequency domain resources for the first transmission opportunity), available resources are left for more transmission opportunities, and optionally, the left available resources meet the following condition:

when the user equipment selects a set of subframes $t_{n+j \times P'_{rsp\_TX}}{}^{SL}$ j=0,1, . . . , optionally, as the time domain resources for the first transmission opportunity; and optionally, a set of time domain resource subframes $t_{n+k+j \times P'_{rsp\_TX}}{}^{SL}$ j=0,1, . . . , for the second transmission opportunity, where −15≤k≤15, and k≠0, the user equipment randomly selects the time domain and frequency domain resources for the second transmission opportunity.

Optionally, the user equipment uses the time domain and frequency domain resources for the second transmission opportunity to select second periodic sidelink resources according to the resource reservation interval (indicating that time-frequency resources in each period correspond to the time domain and frequency domain resources for the second transmission opportunity).

Optionally, the user equipment considers that the second periodic sidelink resources are retransmission opportunities.

Optionally, the second periodic sidelink resources do not overlap, and/or the first periodic sidelink resources do not overlap, and/or the first periodic sidelink resources and the second periodic sidelink resources do not overlap.

Or, optionally, sidelink resources for (corresponding to) the retransmission opportunities do not overlap, and/or sidelink resources for (corresponding to) the new transmission opportunities do not overlap, and/or sidelink resources for (corresponding to) the retransmission opportunities and sidelink resources for (corresponding to) the new transmission opportunities do not overlap.

Figure 5:
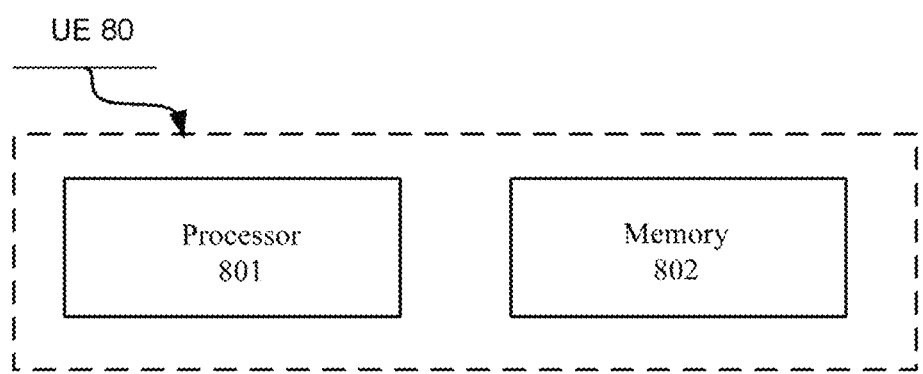
FIG. 5 is a block diagram showing user equipment according to an embodiment of the present invention.

FIG. 5 is a block diagram showing user equipment (UE) according to the present invention. As shown in FIG. 5, user equipment (UE) 80 includes a processor 801 and a memory 802. The processor 801 may include, for example, a microprocessor, a microcontroller, an embedded processor, and the like. The memory 802 may include, for example, a volatile memory (such as a random access memory (RAM)), a hard disk drive (HDD), a non-volatile memory (such as a flash memory), or other memories. The memory 802 stores program instructions. The instructions, when run by the processor 801, can perform the above method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments.

It should be understood that the above-described embodiments of the present invention may be implemented by software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine.

The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A user equipment, comprising:
   a processor; and
   a memory storing instructions,
   wherein the processor is configured by the instructions to cause the user equipment to:
   determine a first set of subframes $t_{n+j\times P'_{rsvp\_TX}}^{SL}$, j=0,1, ... , for a first set of transmission opportunities, and a second set of subframes $t_{n+k+j\times P'_{rsvp\_TX}}^{SL}$, j=0,1, ... , for a second set of transmission opportunities, wherein $P'_{rsvp\_TX}=P_{step}\times P_{rsvp\_TX}/100$, the $P_{rsvp\_TX}$ is a resource reservation interval indicated by higher layers and the $P_{step}$ is determined based on TDD UL/DL configuration, and the second set of subframes shall meet the conditions including $-15\le k\le 15$, $k\ne 0$, and, k mod $P'_{rsvp\_TX}\ne 0$, and,
   transmit a physical sidelink shared channel (PSSCH) in one or more subframes of the first set of the subframes and the second set of subframes.

2. A method performed by user equipment, the method comprising:
   determining a first set of subframes $t_{n+j\times P'_{rsvp\_TX}}^{SL}$, j=0,1, ... , for a first set of transmission opportunities, and a second set of subframes $t_{n+k+j\times P'_{rsvp\_TX}}^{SL}$, j=0,1, ... , for a second set of transmission opportunities, wherein $P'_{rsvp\_TX}=P_{step}\times P_{rsvp\_TX}/100$, the $P_{rsvp\_TX}$ is a resource reservation interval indicated by higher layers and the $P_{step}$ is determined based on TDD UL/DL configuration, and the second set of subframes shall meet the conditions including $-15\le k\le 15$, $k\ne 0$, and, k mod $P'_{rsvp\_TX}=0$, and,
   transmitting a physical sidelink shared channel (PSSCH) in one or more subframes of the first set of the subframes and the second set of subframes.

* * * * *